(12) United States Patent
Gudadhe et al.

(10) Patent No.: US 10,606,841 B2
(45) Date of Patent: Mar. 31, 2020

(54) TECHNOLOGIES FOR AN N-ARY DATA COMPRESSION DECISION ENGINE

(71) Applicant: Intel Corporation, Santa Clara, CA (US)

(72) Inventors: Pradnyesh S. Gudadhe, Chandler, AZ (US); Lokpraveen B. Mosur, Gilbert, AZ (US); Sailesh Bissessur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 15/439,611

(22) Filed: Feb. 22, 2017

(65) Prior Publication Data

US 2018/0239801 A1 Aug. 23, 2018

(51) Int. Cl.
*G06F 16/2455* (2019.01)
*G06F 16/2453* (2019.01)

(52) U.S. Cl.
CPC .. *G06F 16/24561* (2019.01); *G06F 16/24532* (2019.01); *G06F 16/24568* (2019.01)

(58) Field of Classification Search
CPC ........... G06F 17/30501; G06F 17/3053; G06F 17/30445; G06F 17/30516; G06F 2212/401; H03M 7/30; H03M 7/6023; H03M 7/42; H03M 7/60; H03M 7/6064
See application file for complete search history.

(56) References Cited

U.S. PATENT DOCUMENTS

| | | | | |
|---|---|---|---|---|
| 8,786,471 B1* | 7/2014 | Shirguppi | ........... | H03M 7/3088 341/50 |
| 2005/0084152 A1* | 4/2005 | McPeake | .......... | G06F 16/90344 382/173 |
| 2006/0069857 A1* | 3/2006 | Lekatsas | ................ | H03M 7/30 711/108 |
| 2009/0058694 A1* | 3/2009 | Owsley | ................... | H03M 7/40 341/65 |
| 2010/0281079 A1* | 11/2010 | Marwah | ................ | G06F 16/284 707/812 |
| 2014/0149605 A1* | 5/2014 | Annamalaisami | ...... | H04L 41/00 709/247 |
| 2015/0326248 A1* | 11/2015 | Wu | ..................... | H03M 7/3086 341/64 |
| 2016/0078879 A1* | 3/2016 | Lu | ........................... | G10L 25/81 381/56 |

* cited by examiner

*Primary Examiner* — Yuk Ting Choi
(74) *Attorney, Agent, or Firm* — Barnes & Thornburg LLP

(57) ABSTRACT

Technologies for data compression include a computing device having multiple search agents. Each search agent searches a history of an input stream in parallel for a match to the input stream starting at a position based on an index of the search agent. Each search agent generates in parallel a weight value associated with the corresponding match. The weight value is indicative of a length associated with the match and an encoded length associated with the match. The encoded length is indicative of a number of bits to encode the match. The computing device selects a match based on the weight values. The computing device may output a token for the selected match and encode the token using a Huffman coding. Each search agent may be embodied as a hardware component or a software component such as a thread or process. Other embodiments are described and claimed.

19 Claims, 3 Drawing Sheets

TECHNOLOGIES FOR AN N-ARY DATA COMPRESSION DECISION ENGINE

BACKGROUND

Data compression is an important computer operation used in many computing applications, including both server and client applications. For example, data compression may be used to reduce network bandwidth requirements and/or storage requirements for cloud computing applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
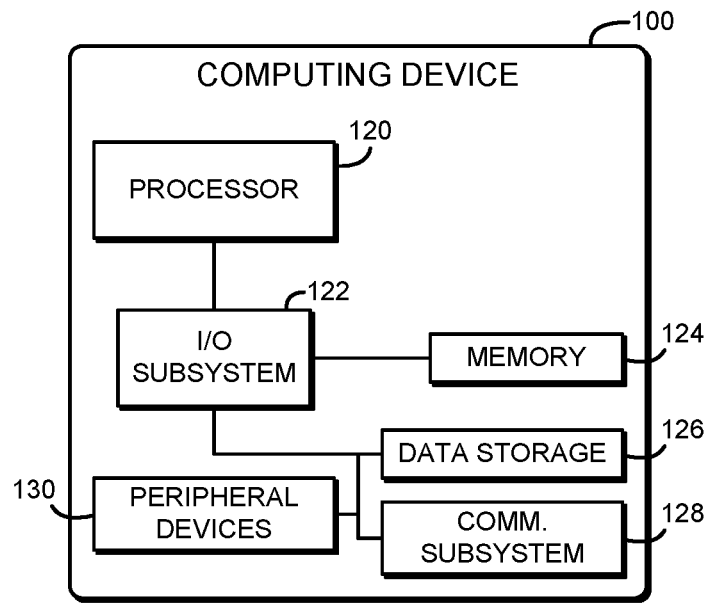
FIG. 1 is a simplified block diagram of at least one embodiment of a computing device for an n-ary data compression decision engine.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for an n-ary data compression decision engine is shown. Many common lossless compression formats are based on the LZ77 compression algorithm. Data compressed using LZ77-based algorithms typically include a stream of symbols (or "tokens"). Each symbol may include literal data that is to be copied to the output or a reference to repeat matching data from the input history. The reference tokens identify the repeated data by including the length of the match and the distance in the history from the current position. Typical compression engines include a decision engine to determine which bytes to encode as literal data and which bytes to encode as reference tokens. Typical decision engines are binary and choose between two potential matches based only on comparing length and distance of the potential matches. The DEFLATE compression algorithm uses LZ77 compression in combination with Huffman encoding to generate compressed output.

In use, as described below, the computing device 100 searches in parallel for potential matches in the history of an input data stream. The computing device 100 searches for matches that start at multiple byte positions in the input data stream. The computing device 100 generates a Huffman weight for each match. The Huffman weight is indicative of the length of the match as well as the probable encoded length of the generated token after Huffman encoding. The Huffman weight may also include an adjacency bonus for a match that is adjacent to another match. The computing device 100 may use move-to-front encoding to further reduce the size of the compressed data after encoding. The computing device 100 selects the match with the highest Huffman weight and outputs literal data and tokens appropriately. Thus, by considering the length of the encoded data with the decision engine, the computing device 100 may offer improved compression ratios over pre-existing decision engines that consider only the length and distance of the token. Additionally, the computing device 100 may provide better compression ratios while comparing more than two potential matches than provided by naïve extension of existing binary decision engines to more than two matches. Accordingly, by supporting searching in parallel for multiple potential matches, the computing device 100 may provide improved parallelism and scalability.

The computing device 100 may be embodied as any type of device capable of performing the functions described herein. For example, the computing device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative computing device 100 includes the processor 120, the I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 100 may further include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
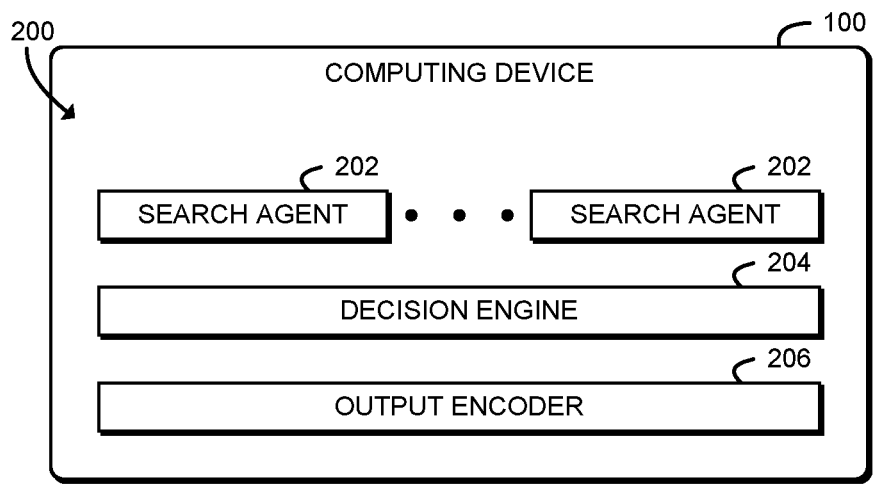
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes multiple search agents 202, a decision engine 204, and an output encoder 206. The various components of the environment 200 may be embodied as hardware, firmware, software, or a combination thereof. As such, in some embodiments, one or more of the components of the environment 200 may be embodied as circuitry or collection of electrical devices (e.g., search agent circuitry 202, decision engine circuitry 204, and/or output encoder circuitry 206). It should be appreciated that, in such embodiments, one or more of the search agent circuitry 202, the decision engine circuitry 204, and/or the output encoder circuitry 206 may form a portion of the processor 120, the I/O subsystem 122, and/or other components of the computing device 100. Additionally, in some embodiments, one or more of the illustrative components may form a portion of another component and/or one or more of the illustrative components may be independent of one another.

Each search agent 202 is configured to search a history of an input stream in parallel for a corresponding match. Thus, the search agents 202 are configured to search the history in parallel for multiple matches. Each match may be embodied as a substring of the history that matches the input stream starting at a corresponding position. The starting position is based on an index of the corresponding search agent 202. Each match is also associated with a length and a distance. Each search agent 202 is further configured to generate, in parallel, a corresponding weight value associated with each of the matches. Thus, the search agents 202 are configured to generate in parallel multiple weight values. Each weight value is indicative of the length associated with the corresponding match and an encoded length associated with the corresponding match. The encoded length is indicative of a number of bits used to encode the corresponding match.

Generating a weight value may include generating one or more raw scores associated with the corresponding match based on the associated length or encoded length. For example, the raw score may include a length weight, a frequency count weight, and/or an extra bit weight. The raw score(s) may be normalized to generate one or more percentile weight(s) based on a maximum of the raw scores associated with all of the matches. The weight value may be generated as a function of the percentile weight(s). The length weight may be generated as a function of the length associated with the match and the index of the associated search agent 202. The frequency count weight may be generated as a function of frequency counts associated with the length and the first distance associated with the corresponding match. The extra bit weight may be generated as a function of a number of extra bits corresponding to the distance and a predetermined maximum number of extra bits. Generating the weight value may also include determining whether a match is adjacent to another match and, if so, generating the weight value as a function of an adjacency bonus. Generating the weight value may include adjusting a relative importance of each percentile weight of the one or more percentile weights.

In some embodiments, generating a weight value may include determining whether the distance associated with the corresponding match is included in a move-to-front stack and, if so, replacing the distance with a symbol from the move-to-front stack. The distance may be moved to the front of the move-to front stack in response to determining whether it is included in the move-to-front stack.

The decision engine 204 is configured to select a selected match from the matches as a function of the weight values. The output encoder 206 is configured to output a token for the selected match. The token is indicative of the length and the distance associated with the selected match. The output encoder 206 is further configured to encode the token with a Huffman coding in response to an output of the token.

Figure 3:
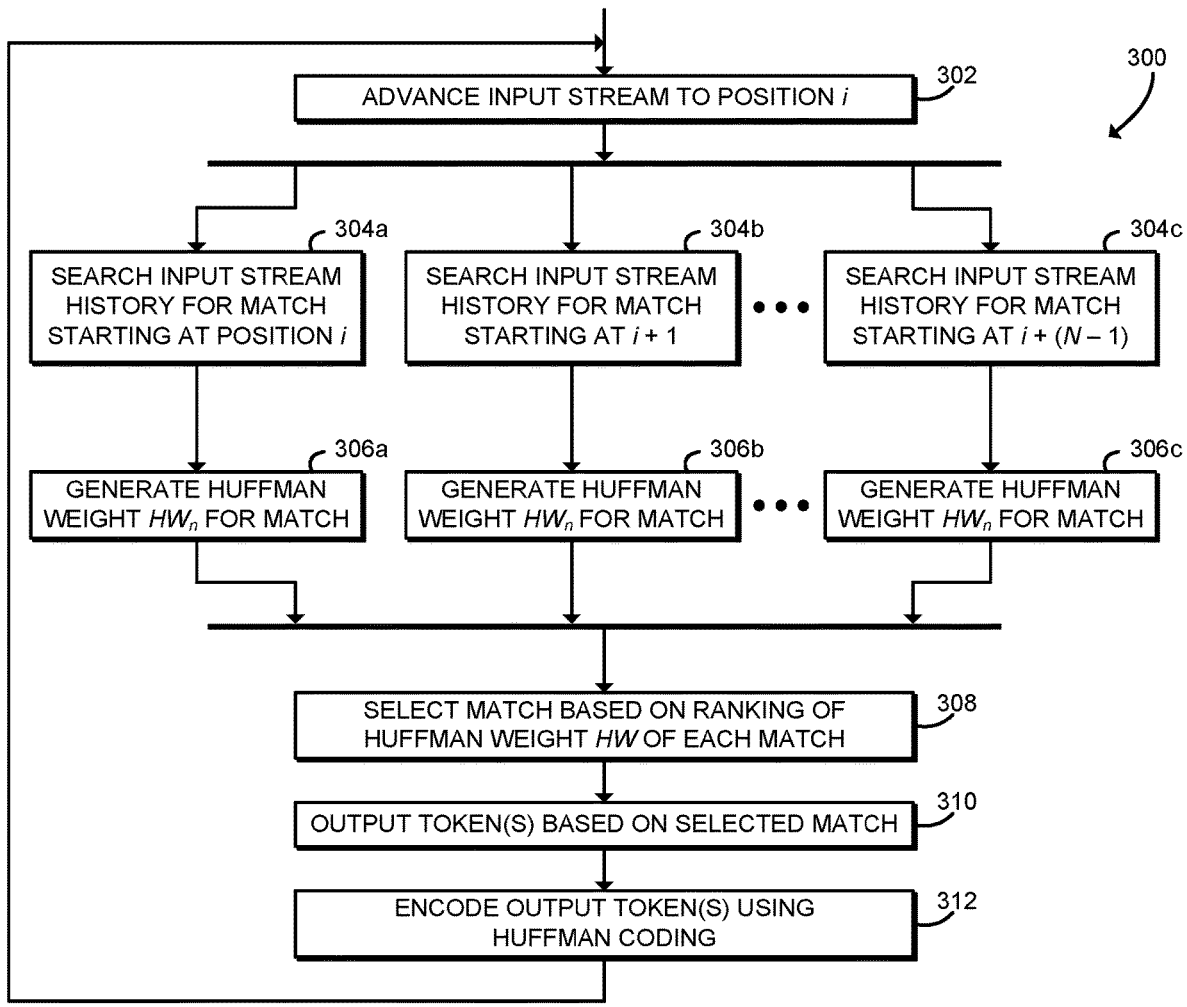
FIG. 3 is a simplified flow diagram of at least one embodiment of a method for an n-ary data compression decision engine that may be executed by the computing device of FIGS. 1 and 2.

Referring now to FIG. 3, in use, the computing device 100 may execute a method 300 for an n-ary data compression decision engine. It should be appreciated that, in some embodiments, the operations of the method 300 may be performed by one or more components of the environment 200 of the computing device 100 as shown in FIG. 2. The method 300 begins in block 302, in which the computing device 100 advances an input data stream to a position i. The input data stream may be embodied as any file, network stream, or other input data that is to be compressed by the computing device 100. The position i represents a byte offset in the input data stream, and may be at the beginning of the file (i.e., byte offset zero) or, as described further below, at a position after the end of the most recent match token. The computing device 100 may perform any data stream read, seek, or other operation required to prepare the input data stream for access at position i.

After advancing the input stream, the method 300 proceeds in parallel to block 304. In particular, the computing device 100 executes N instances of the block 304 in parallel. For example, each instance of the block 304 may be executed by a different search agent 202, which may be embodied as a separate hardware component or a separate software thread, process, or other software component. In each instance of block 304, a search agent 202 of the computing device 100 searches the input data stream history for a substring that matches the input data stream starting at a position i+n, where n is an index of the search agent 202, from zero to N−1. For example, search agent 202 at index n=0 searches for matches starting at position i, illustrated in block 304a; search agent 202 at index n=1 searches for matches starting at position i+1, illustrated in block 304b; and search agent 202 at index n=N−1 searches for matches starting at position i+N−1, illustrated in block 304c. Each match identifies a length of the match and a distance backward in the input stream from the corresponding position of the search.

Figure 4:
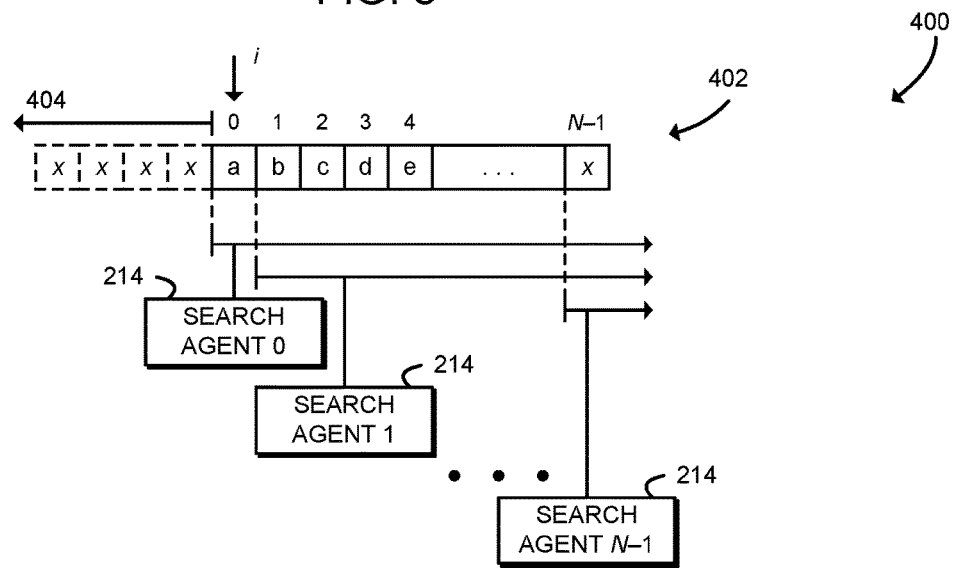
FIG. 4 is a schematic diagram illustrating multiple search agents searching an input data stream.

Referring now to FIG. 4, diagram 400 illustrates the assignment of search agents 202 to positions in an input data stream 402. The diagram 400 illustrates the input data stream 402 as a series of bytes labeled a, b, c, and so on. The diagram 400 further illustrates, the position i in the input data stream 402. As shown, the input data stream 402 includes a history 404 of bytes that occurred before the position i. As shown, search agent 202 at index n=0 searches for matches in the history 404 that match the input data stream 402 starting at position i+10, that is, for matches to a string starting with "abcde . . . " Similarly, search agent 202 at index n=1 searches for matches in the history 404 that match part of the input data stream 402 starting at position i+11, that is, for partial matches to a string starting with "bcde . . . " Search agents 202 are assigned to search for matches starting at each consecutive byte of the input data stream 402 up to search agent 202 at index n=N−1, which searches for matches in the history 404 that match part of the input data stream 402 starting at position i+(N−1).

Referring back to FIG. 3, after finding N matches in the input data stream history in the blocks 304, the method 300 proceeds in parallel to blocks 306. In each instance of the block 306, a search agent 202 of the computing device 100 generates a Huffman weight $HW_n$ that corresponds to the match found by that search agent 202. Each Huffman weight $HW_n$ may be embodied as a composite weight value that is indicative of the length of the match as well as an encoded length that is predicted for the match after Huffman encoding. The encoded length may be embodied as the number of bits that are used to encode the length and/or distance of the match, and the computing device 100 may estimate the encoded length based on currently available information. Higher $HW_n$ values indicate a longer match length and/or a shorter encoded length, which both tend to increase compression ratio. One potential embodiment of a method for determining the Huffman weight $HW_n$ for each match is described below in connection with FIG. 5.

After generating N Huffman weights $HW_n$ in the blocks 306, the method 300 proceeds in serial to block 308, in which the computing device 100 selects a match based on a ranking of the Huffman weight $HW_n$ associated with each match. The computing device 100 may, for example, select the match having the largest Huffman weight $HW_n$. In block 310, the computing device 100 outputs one or more tokens based on the selected match. The computing device 100 may output a match token identifying the length and distance of the selected match, as well as one or more literal tokens for any bytes of the input data stream that occur before the selected match. For example, in an embodiment, a match for the position i+12 in the input data stream may be selected. In that example, the computing device 100 may output a literal token for the position i, another literal token for the position i+1, and a match token for position i+12. In some embodiments, the computing device 100 may encode certain match tokens using a move-to-front stack, as described further below in connection with FIG. 5.

In block 312, the computing device 100 encodes the output tokens using a Huffman coding. The Huffman coding generates a binary representation of the output tokens, with the most frequent tokens using a smaller number of bits. Thus, although illustrated as occurring sequentially in the method 300, it should be understood that the Huffman encoding may be performed after generating output tokens for the entire input data stream (and/or an entire block of the input data stream). The computing device 100 may encode the output tokens according to the DEFLATE algorithm. The computing device 100 may assign one or more Huffman codes to each token (literal or match) and then encode each of the codes into a variable number of bits. In particular, the computing device 100 may encode a literal token as a Huffman code corresponding to an ordinary byte (i.e., a Huffman code from 0 to 255). Match tokens are replaced by a length code and a distance code and any associated extra bits. The length codes are included in the same alphabet as the literal codes, and the distance codes are included in a separate alphabet. Each length code or distance code may represent a range of lengths or distances, respectively. The extra bits identify the exact length or distance. Table 1, below, illustrates length codes and extra bits that may be used to encode length values. As shown, each length code may be associated with between zero and five extra bits. Table 2, below, illustrates distance codes and extra bits that may be used to encode distance values. As shown, each distance code may be associated with between zero and 13 extra bits. The computing device 100 converts each Huffman code to a variable number of bits, with a smaller number of bits used for the most frequently occurring codes. The extra bits are included in the output directly, without any run-length encoding. The DEFLATE compressed data format is further described in RFC 1951 (1996). After encoding the output tokens using the Huffman coding, the method 300 loops back to block 302 to advance the position i in the input data stream and continue to search for matches in the history of the input data stream.

TABLE 1

Length codes, length ranges, and corresponding extra bits.

| Length Code | Length Range | Extra Bits |
| --- | --- | --- |
| 257 | 3 | 0 |
| 258 | 4 | 0 |
| 259 | 5 | 0 |
| 260 | 6 | 0 |
| 261 | 7 | 0 |
| 262 | 8 | 0 |
| 263 | 9 | 0 |
| 264 | 10 | 0 |
| 265 | 11-12 | 1 |
| 266 | 13-14 | 1 |
| 267 | 15-16 | 1 |
| 268 | 17-18 | 1 |
| 269 | 19-22 | 2 |
| 270 | 23-26 | 2 |
| 271 | 27-30 | 2 |
| 272 | 31-34 | 2 |
| 273 | 35-42 | 3 |
| 274 | 43-50 | 3 |
| 275 | 51-58 | 3 |
| 276 | 59-66 | 3 |
| 277 | 67-82 | 4 |
| 278 | 83-98 | 4 |
| 279 | 99-114 | 4 |
| 280 | 115-130 | 4 |
| 281 | 131-162 | 5 |
| 282 | 163-194 | 5 |
| 283 | 195-226 | 5 |
| 284 | 227-257 | 5 |
| 285 | 258 | 0 |

TABLE 2

Distance codes, distance ranges, and corresponding extra bits.

| Distance Code | Distance Range | Extra Bits |
| --- | --- | --- |
| 0 | 1 | 0 |
| 1 | 2 | 0 |
| 2 | 3 | 0 |
| 3 | 4 | 0 |
| 4 | 5-6 | 1 |
| 5 | 7-8 | 1 |
| 6 | 9-12 | 2 |
| 7 | 13-16 | 2 |
| 8 | 17-24 | 3 |
| 9 | 25-32 | 3 |
| 10 | 33-48 | 4 |
| 11 | 49-64 | 4 |
| 12 | 65-96 | 5 |
| 13 | 97-128 | 5 |
| 14 | 129-192 | 6 |
| 15 | 193-256 | 6 |
| 16 | 257-384 | 7 |
| 17 | 385-512 | 7 |
| 18 | 513-768 | 8 |
| 19 | 769-1024 | 8 |
| 20 | 1025-1536 | 9 |
| 21 | 1537-2048 | 9 |
| 22 | 2049-3072 | 10 |
| 23 | 3073-4096 | 10 |
| 24 | 4097-6144 | 11 |
| 25 | 6145-8192 | 11 |
| 26 | 8193-12,288 | 12 |
| 27 | 12,289-16,384 | 12 |
| 28 | 16,385-24,576 | 13 |
| 29 | 24,577-32,768 | 13 |

Figure 5:
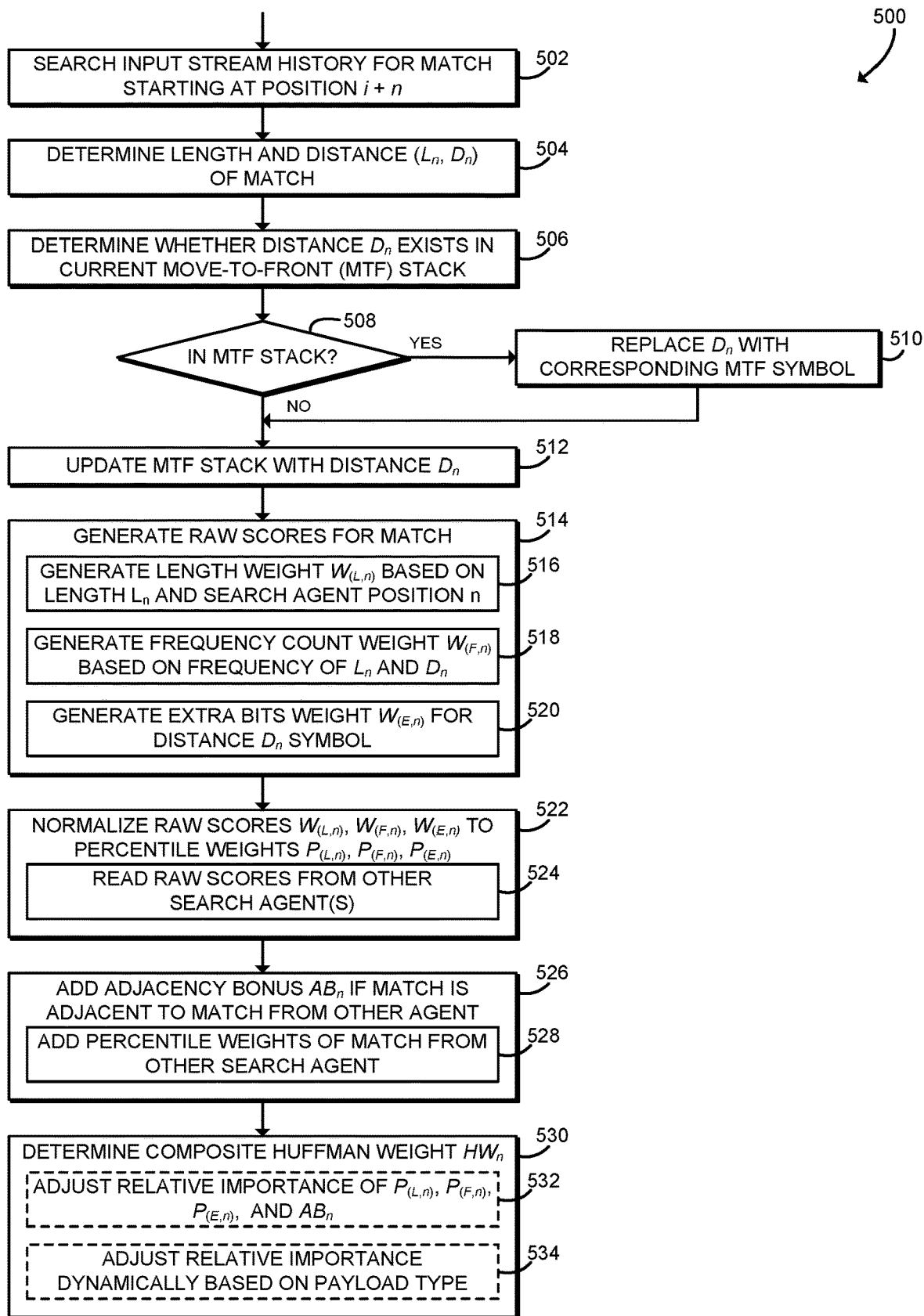
FIG. 5 is a simplified flow diagram of at least one embodiment of a method for generating a Huffman weight for a match that may be executed by the computing device of FIGS. 1-2.

Referring now to FIG. 5, in use, the computing device 100 may execute a method 500 for calculating a Huffman weight $HW_n$ associated with a particular match found in the input data stream history. It should be appreciated that, in some embodiments, the operations of the method 500 may be performed by one or more components of the environment 200 of the computing device 100 as shown in FIG. 2. For example, as described above in connection with blocks 304, 306 of FIG. 3, multiple instances of the method 500 may be executed in parallel by the search agents 202 of the computing device 100. The method 500 begins in block 502, in which the computing device 100 searches the input data stream history for a match starting at position i+n of the input data stream. As described above in connection with FIGS. 3 and 4, n represents the relative index of the current search agent 202 with respect to the other search agents 202 that are executed in parallel. Thus, n may range between zero and N−1, where N is the total number of search agents 202 executed in parallel. The computing device 100 identifies a match, which may be embodied as a substring in the input data stream history that matches the input data stream starting at position i+n. In block 504, the computing device 100 identifies a length $L_n$ and a distance $D_n$ for the match. The length $L_n$ may be the length of the matching string in bytes, and the distance $D_n$ may be the distance in bytes back in the input data stream history from the position i+n to the start of the match.

In block 506, the computing device 100 determines whether the distance $D_n$ exists in the current move-to-front (MTF) stack. The computing device 100 may maintain a move-to-front stack that includes a certain number (e.g., four) of the most recently used distances. In block 508, the computing device 100 checks whether the distance $D_n$ is included in the MTF stack. If not, the method advances to block 512, described below. If the distance $D_n$ is included in the MTF stack, the method 500 branches to block 510, in which the computing device 100 replaces the distance $D_n$ with a corresponding MTF symbol. The computing device 100 may reserve certain Huffman codes for the MTF symbols. Unlike many potential distance values, the MTF symbols may be encoded without any extra bits. Therefore, a recently used distance $D_n$ that is included in the MTF stack and replaced with an MTF symbol will not require any extra bits and may reduce the size of the compressed data. In particular, replacing distances with MTF symbols may improve compression ratios for input data streams that include matches at regular intervals, such as certain database file formats. After replacing the distance $D_n$ with the corresponding MTF symbol, the method 500 advances to block 512.

In block 512, the computing device 100 updates the MTF stack with the distance $D_n$. The computing device 100 may, for example, push the distance $D_n$ onto the front of the MTF stack or, if already included in the MTF stack, move the distance $D_n$ to the front of the stack. Thus, the MTF stack maintains the most-recently used distances. Additionally, it should be understood that compressed data generated using the MTF stack may not be compatible with decompression using the conventional DEFLATE algorithm. Accordingly, in some embodiments the computing device 100 may not use the MTF stack and may instead skip directly from block 504 to block 514.

In block 514, the computing device 100 generates a set of raw scores for the match that are indicative of the length of the match and the encoded length of the match. In block 516, the computing device 100 generates a length weight $W_{(L,n)}$ based on the length $L_n$ and the search index n. The computing device 100 may determine the length weight $W_{(L,n)}$ using Equation 1, below. As shown, the length weight $W_{(L,n)}$ is equal to the length $L_n$ reduced by the search index n. Subtracting n from the length $L_n$ accounts for outputting literal bytes from the input data stream that occur before the search index n. For example, when n=2, outputting a match token also requires outputting a literal token for index n=0 and index n=1. Thus, the length of the current match is effectively reduced, which in turn reduces the length weight $W_{(L,n)}$.

$$W_{(L,n)} = L_n - n \quad (1)$$

In block 518, the computing device 100 generates a frequency count weight $W_{(F,n)}$ based on the frequency of the length $L_n$ and the distance D. The computing device 100 may determine the frequency count weight $W_{(F,n)}$ using Equation 2, below. The function FC returns the number of times that the Huffman code for the distance $D_n$ or the length $L_n$ has occurred in the input data stream. Because the Huffman encoding encodes more-frequent codes with a smaller number of bits, a match with a larger frequency count may tend to produce a smaller number of encoded bits.

$$W_{(F,n)} = FC(D_n) + FC(L_n) \quad (2)$$

In block 520, the computing device 100 generates an extra bits weight $W_{(E,n)}$ based on the number of extra bits needed to encode the distance D. The computing device 100 may determine the extra bits weight $W_{(E,n)}$ using Equation 3, below. The function E determines the number of extra bits needed to encode a particular distance D. The number of extra bits may be determined, for example, using a data table such as Table 2, above. Additionally, as described above in connection with block 510, in some embodiments a distance $D_n$ occurring in the move-to-front (MTF) stack may be replaced with a special symbol that requires zero extra bits. In the illustrative embodiment, distances require between zero and 13 extra bits to encode. Therefore, the extra bits weight $W_{(E,n)}$ is largest when zero extra bits are required and smallest when the maximum amount of extra bits (i.e., 13) is required. Of course, a different constant value may be used to determine the extra bits weight $W_{(E,n)}$ in embodiments using a different maximum number of extra bits.

$$W_{(E,n)} = 13 - E(D_n) \quad (3)$$

In block 522, the computing device 100 normalizes each of the raw scores $W_{(L,n)}$, $W_{(F,n)}$, and $W_{(E,n)}$ to generate corresponding percentile weights $P_{(L,n)}$, $P_{(F,n)}$, and $P_{(E,n)}$. In particular, the computing device 100 may identify the maximum raw score of all of the search agents 202 and then scale the raw score of the search agent 202 at index n as a percentage of the maximum score. For example, the computing device 100 may use Equation 4, below, to calculate the percentile weight for each of the raw scores $W_{(L,n)}$, $W_{(F,n)}$, and $W_{(E,n)}$. The value $W_{(x,m)}$ represents the raw score (e.g., the score $W_{(L,m)}$, $W_{(F,m)}$, or $W_{(E,m)}$ from the search agent 202 at index m, which is the maximum raw score value of all of the search agents 202. Accordingly, in block 524 the computing device 100 reads raw scores from all of the other search agents 202 to identify the maximum score. The computing device 100 may use any synchronization technique to read values from the other search agents 202.

$$P_{(x,n)} = \frac{W_{(x,n)} \times 100}{W_{(x,m)}} \quad (4)$$

In block 526, the computing device 100 adds an adjacency bonus $AB_n$ if the match is adjacent to a match from another search agent 202. For example, a match starting at position i+1 of length 3 would be adjacent to a match starting at position i+4. Adjacent matches may be output without intervening literal tokens and thus may improve overall compression ratio. In block 528, the computing device 100 may determine the adjacency bonus by adding together the percentile weights of the adjacent match. For example, the computing device 100 may determine the adjacency bonus $AB_n$ using Equation 5, below. As shown, the adjacency bonus $AB_n$ for the current search agent 202 at index n is determined by adding the percentile weights $P_{(L,m)}$, $P_{(F,m)}$, and $P_{(E,m)}$ of the adjacent search agent 202 at index m. Again, the computing device 100 may use any synchronization technique to share percentile weights between the search agents 202.

$$AB_n = P_{(L,m)} + P_{(F,m)} + P_{(E,m)} \quad (5)$$

In block 530, the computing device 100 determines the composite Huffman weight $HW_n$ for the current match. The Huffman weight $HW_n$ is generated as a function of the percentile weights $P_{(L,n)}$, $P_{(F,n)}$, and $P_{(E,n)}$ as well as any applicable adjacency bonus $AB_n$. In some embodiments, in block 532 the computing device 100 may adjust the relative importance of $P_{(L,n)}$, $P_{(F,n)}$, $P_{(E,n)}$, and $AB_n$. For example, the computing device 100 may determine the Huffman weight $HW_n$ using Equation 6, below. Each of the values $C_L$, $C_F$, $C_E$, and $C_{AB}$ are multiplicative constants that may be adjusted to tune the relative importance of $P_{(L,n)}$, $P_{(F,n)}$, $P_{(E,n)}$, and $AB_n$. Values for the constants $C_L$, $C_F$, $C_E$, and $C_{AB}$ may be determined through intuition and/or through simulation or testing. In some embodiments, in block 534 the relative importance of $P_{(L,n)}$, $P_{(F,n)}$, $P_{(E,n)}$, and $AB_n$ may be adjusted dynamically based on payload type; that is, based on the data type of the input data stream. The computing device 100 may, for example, vary the values of one or more of the constants $C_L$, $C_F$, $C_E$, and $C_{AB}$ based on a file format or other data type of the input data stream. After determining the Huffman weight $HW_n$, the method 500 is complete. As described above in connection with FIG. 3, after determining the Huffman weight $HW_n$ for all of the search agents 202, the decision engine 204 ranks and selects a match based on the Huffman weight $HW_n$. The method 500 may be executed repeatedly to determine Huffman weights $HW_n$ for additional matches found in the input data stream history.

$$HW_n = C_L P_{(L,n)} + C_F P_{(F,n)} + C_E P_{(E,n)} + C_{AB} AB_n \quad (6)$$

It should be appreciated that, in some embodiments, the methods 300 and/or 500 may be embodied as various instructions stored on a computer-readable media, which may be executed by the processor 120, the I/O subsystem 122, and/or other components of the computing device 100 to cause the computing device 100 to perform the method 300 and/or 500, respectively. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

EXAMPLES

Illustrative examples of the technologies disclosed herein are provided below. An embodiment of the technologies may include any one or more, and any combination of, the examples described below.

Example 1 includes a computing device for data compression token generation, the computing device comprising: a plurality of search agents to search for a plurality of matches and to generate a plurality of weight values, wherein each search agent is associated with a different index, and wherein each search agent is to: search, in parallel, a history of an input stream for a corresponding match of the plurality of matches, wherein the corresponding match comprises a substring of the history that matches the input stream starting at a position that is based on the index associated with the search agent, and wherein the corresponding match is associated with a length and a distance; and generate, in parallel, a corresponding weight value of the plurality of weight values, wherein each weight value is associated with a corresponding match of the plurality of matches, and wherein each weight value is indicative of the length associated with the corresponding match and an encoded length associated with the corresponding match, wherein the encoded length is indicative of a number of bits to encode the corresponding match; and a decision engine to select a selected match from the plurality of matches as a function of the plurality of weight values.

Example 2 includes the subject matter of Example 1, and further comprising an output encoder to: output a token for the selected match, wherein the token is indicative of the length and the distance associated with the selected match; and encode the token with a Huffman coding in response to an output of the token.

Example 3 includes the subject matter of any of Examples 1 and 2, and wherein the plurality of search agents comprises: a first search agent to (i) search the history of the input stream for a first match, wherein the first match comprises a substring that matches the input stream starting at a first position, and wherein the first match is associated with a first length and a first distance, and (ii) generate a first weight value associated with the first match, wherein the first weight value is indicative of the first length and the encoded length associated with the first match; and a second search agent to (i) search, in parallel with the first search agent, the history of the input stream for a second match, wherein the second match comprises a substring that matches the input stream starting at a second position that is after the first position, and wherein the second match is associated with a second length and a second distance, and (ii) generate a second weight value associated with the second match, wherein the second weight value is indicative of the second length and the encoded length associated with the second match.

Example 4 includes the subject matter of any of Examples 1-3, and wherein to generate the corresponding weight value comprises to determine whether the distance associated with the corresponding match is included in a move-to-front stack; replace the distance associated with the corresponding match with a symbol from the move-to-front stack in response to a determination that the distance associated with the corresponding match is included in the move-to-front stack; and move the distance associated with the corresponding match to a front of the move-to front stack in response to a determination of whether the distance associated with the corresponding match is included in the move-to-front stack.

Example 5 includes the subject matter of any of Examples 1-4, and wherein to generate the corresponding weight value comprises to: generate a raw score associated with the corresponding match based on the length associated with the corresponding match or the encoded length associated with the corresponding match; normalize the raw score to generate a percentile weight based on a maximum of a plurality of raw scores, wherein each raw score of the plurality of raw scores is associated with a match of the plurality of matches; and generate the corresponding weight value as a function of the percentile weight.

Example 6 includes the subject matter of any of Examples 1-5, and wherein to normalize the raw score comprises to normalize the raw score as a function of a ratio of the raw score and the maximum raw score.

Example 7 includes the subject matter of any of Examples 1-6, and wherein to generate the raw score comprises to generate a length weight as a function of the length associated with the corresponding match and the index associated with the search agent.

Example 8 includes the subject matter of any of Examples 1-7, and wherein to generate the raw score comprises to generate a frequency count weight as a function of a first frequency count of the length associated with the corresponding match and a second frequency count of the distance associated with the corresponding match.

Example 9 includes the subject matter of any of Examples 1-8, and wherein to generate the raw score comprises to generate an extra bit weight as a function of a number of extra bits corresponding to the distance associated with the corresponding match and a predetermined maximum number of extra bits.

Example 10 includes the subject matter of any of Examples 1-9, and wherein to generate the corresponding weight value comprises to: generate a plurality of raw scores associated with the corresponding match based on the length associated with the corresponding match and the encoded length associated with the corresponding match; normalize each of the plurality of raw scores to generate a plurality of percentile weights, wherein each percentile weight is associated with a corresponding raw score; and generate the corresponding weight value as a function of the plurality of percentile weights.

Example 11 includes the subject matter of any of Examples 1-10, and wherein to generate the plurality of raw scores comprises to generate a length weight, a frequency count weight, and an extra bit weight.

Example 12 includes the subject matter of any of Examples 1-11, and wherein to generate the corresponding weight value further comprises to: determine whether the corresponding match is adjacent to another match of the plurality of matches; and generate the corresponding weight value as a function of an adjacency bonus in response to a determination that the corresponding match is adjacent to another match, wherein the adjacency bonus comprises a plurality of percentile weights associated with the other match.

Example 13 includes the subject matter of any of Examples 1-12, and wherein to generate the corresponding weight value as a function of the plurality of percentile weights comprises to adjust a relative importance of each percentile weight of the plurality of percentile weights.

Example 14 includes the subject matter of any of Examples 1-13, and wherein to adjust the relative importance of each percentile weight of the plurality of percentile weights comprises to: multiply each percentile weight of the plurality of percentile weights by a corresponding constant to generate a corresponding product; and sum the plurality of products to generate the corresponding weight value.

Example 15 includes the subject matter of any of Examples 1-14, and wherein to adjust the relative importance of each percentile weight comprises to adjust the relative importance of each percentile weight based on a data type of the input data stream.

Example 16 includes a method for data compression token generation, the method comprising: searching in parallel, by a computing device, a history of an input stream for a plurality of matches, wherein each match comprises a substring of the history that matches the input stream starting at a position based on a corresponding index, and wherein each match is associated with a length and a distance; generating in parallel, by the computing device, a plurality of weight values, wherein each weight value is associated with a corresponding match of the plurality of matches, and wherein each weight value is indicative of the length associated with the corresponding match and an encoded length associated with the corresponding match, wherein the encoded length is indicative of a number of bits to encode the corresponding match; and selecting, by the computing device, a selected match from the plurality of matches as a function of the plurality of weight values.

Example 17 includes the subject matter of Example 16, and further comprising: outputting, by the computing device, a token for the selected match, wherein the token is indicative of the length and the distance associated with the selected match; and encoding, by the computing device, the token with a Huffman coding in response to outputting the token.

Example 18 includes the subject matter of any of Examples 16 and 17, and wherein: searching in parallel the history of the input stream for the plurality of matches comprises (i) searching the history of the input stream for a first match, wherein the first match comprises a substring that matches the input stream starting at a first position, and wherein the first match is associated with a first length and a first distance, and (ii) searching, in parallel with searching the history for the first match, the history of the input stream for a second match, wherein the second match comprises a substring that matches the input stream starting at a second position that is after the first position, and wherein the second match is associated with a second length and a second distance; and generating in parallel the plurality of weight values comprises (i) generating a first weight value associated with the first match, wherein the first weight value is indicative of the first length and the encoded length associated with the first match, and (ii) generating a second weight value associated with the second match, wherein the second weight value is indicative of the second length and the encoded length associated with the second match.

Example 19 includes the subject matter of any of Examples 16-18, and wherein generating in parallel the plurality of weight values comprises generating a first weight value associated with a first match of the plurality of matches, and wherein generating the first weight value comprises: determining whether a first distance of the first match is included in a move-to-front stack; replacing the first distance with a corresponding symbol from the move-to-front stack in response to determining that the first distance of the first match is included in the move-to-front stack; and moving the first distance to a front of the move-to front stack in response to determining whether the first distance of the first match is included in the move-to-front stack.

Example 20 includes the subject matter of any of Examples 16-19, and wherein generating in parallel the plurality of weight values comprises generating a first weight value associated with a first match of the plurality of matches, and wherein generating the first weight value comprises: generating a raw score associated with the first match based on the length associated with the first match or the encoded length associated with the first match; normalizing the raw score to generate a percentile weight based on a maximum of a plurality of raw scores, wherein each raw score of the plurality of raw scores is associated with a corresponding match of the plurality of matches; and generating the first weight value as a function of the percentile weight.

Example 21 includes the subject matter of any of Examples 16-20, and wherein normalizing the raw score comprises normalizing the raw score as a function of a ratio of the raw score and the maximum raw score.

Example 22 includes the subject matter of any of Examples 16-21, and wherein generating the raw score comprises generating a length weight as a function of the length associated with the first match and the index associated with the first match.

Example 23 includes the subject matter of any of Examples 16-22, and wherein generating the raw score comprises generating a frequency count weight as a function of a first frequency count of the first length and a second frequency count of the first distance.

Example 24 includes the subject matter of any of Examples 16-23, and wherein generating the raw score comprises generating an extra bit weight as a function of a number of extra bits corresponding to the first distance and a predetermined maximum number of extra bits.

Example 25 includes the subject matter of any of Examples 16-24, and wherein generating in parallel the plurality of weight values comprises generating a first weight value associated with a first match of the plurality of matches, and wherein generating the first weight value comprises: generating a plurality of raw scores associated with the first match based on the length associated with the first match and the encoded length associated with the first match; normalizing each of the plurality of raw scores to generate a plurality of percentile weights, wherein each percentile weight is associated with a corresponding raw score; and generating the first weight value as a function of the plurality of percentile weights.

Example 26 includes the subject matter of any of Examples 16-25, and wherein generating the plurality of raw scores comprises generating a length weight, a frequency count weight, and an extra bit weight.

Example 27 includes the subject matter of any of Examples 16-26, and wherein generating the first weight value further comprises: determining whether the first match is adjacent to another match of the plurality of matches; and generating the first weight value as a function of an adjacency bonus in response to determining that the first match is adjacent to another match, wherein the adjacency bonus comprises a plurality of percentile weights associated with the other match.

Example 28 includes the subject matter of any of Examples 16-27, and wherein generating the first weight value as a function of the plurality of percentile weights comprises adjusting a relative importance of each percentile weight of the plurality of percentile weights.

Example 29 includes the subject matter of any of Examples 16-28, and wherein adjusting the relative importance of each percentile weight of the plurality of percentile weights comprises: multiplying each percentile weight of the plurality of percentile weights by a corresponding constant to generate a corresponding product; and summing the plurality of products to generate the first weight value.

Example 30 includes the subject matter of any of Examples 16-29, and wherein adjusting the relative importance of each percentile weight comprises adjusting the relative importance of each percentile weight based on a data type of the input data stream.

Example 31 includes a computing device comprising: a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for data compression token generation, the computing device comprising: means for searching in parallel a history of an input stream for a plurality of matches, wherein each match comprises a substring of the history that matches the input stream starting at a position based on a corresponding index, and wherein each match is associated with a length and a distance; means for generating in parallel a plurality of weight values, wherein each weight value is associated with a corresponding match of the plurality of matches, and wherein each weight value is indicative of the length associated with the corresponding match and an encoded length associated with the corresponding match, wherein the encoded length is indicative of a number of bits to encode the corresponding match; and means for selecting a selected match from the plurality of matches as a function of the plurality of weight values.

Example 35 includes the subject matter of Example 34, and further comprising: means for outputting a token for the selected match, wherein the token is indicative of the length and the distance associated with the selected match; and means for encoding the token with a Huffman coding in response to outputting the token.

Example 36 includes the subject matter of any of Examples 34 and 35, and wherein: the means for searching in parallel the history of the input stream for the plurality of matches comprises (i) means for searching the history of the input stream for a first match, wherein the first match comprises a substring that matches the input stream starting at a first position, and wherein the first match is associated with a first length and a first distance, and (ii) means for searching, in parallel with searching the history for the first match, the history of the input stream for a second match, wherein the second match comprises a substring that matches the input stream starting at a second position that is after the first position, and wherein the second match is associated with a second length and a second distance; and the means for generating in parallel the plurality of weight values comprises (i) means for generating a first weight value associated with the first match, wherein the first weight value is indicative of the first length and the encoded length associated with the first match, and (ii) means for generating a second weight value associated with the second match, wherein the second weight value is indicative of the second length and the encoded length associated with the second match.

Example 37 includes the subject matter of any of Examples 34-36, and wherein the means for generating in parallel the plurality of weight values comprises means for generating a first weight value associated with a first match of the plurality of matches, and wherein the means for generating the first weight value comprises: means for determining whether a first distance of the first match is included in a move-to-front stack; means for replacing the first distance with a corresponding symbol from the move-to-front stack in response to determining that the first distance of the first match is included in the move-to-front stack; and means for moving the first distance to a front of the move-to front stack in response to determining whether the first distance of the first match is included in the move-to-front stack.

Example 38 includes the subject matter of any of Examples 34-37, and wherein the means for generating in parallel the plurality of weight values comprises means for generating a first weight value associated with a first match of the plurality of matches, and wherein the means for generating the first weight value comprises: means for generating a raw score associated with the first match based on the length associated with the first match or the encoded length associated with the first match; means for normalizing the raw score to generate a percentile weight based on a maximum of a plurality of raw scores, wherein each raw score of the plurality of raw scores is associated with a corresponding match of the plurality of matches; and means for generating the first weight value as a function of the percentile weight.

Example 39 includes the subject matter of any of Examples 34-38, and wherein the means for normalizing the raw score comprises means for normalizing the raw score as a function of a ratio of the raw score and the maximum raw score.

Example 40 includes the subject matter of any of Examples 34-39, and wherein the means for generating the raw score comprises means for generating a length weight as a function of the length associated with the first match and the index associated with the first match.

Example 41 includes the subject matter of any of Examples 34-40, and wherein the means for generating the raw score comprises means for generating a frequency count weight as a function of a first frequency count of the first length and a second frequency count of the first distance.

Example 42 includes the subject matter of any of Examples 34-41, and wherein the means for generating the raw score comprises means for generating an extra bit weight as a function of a number of extra bits corresponding to the first distance and a predetermined maximum number of extra bits.

Example 43 includes the subject matter of any of Examples 34-42, and wherein the means for generating in parallel the plurality of weight values comprises means for generating a first weight value associated with a first match of the plurality of matches, and wherein the means for generating the first weight value comprises: means for generating a plurality of raw scores associated with the first match based on the length associated with the first match and the encoded length associated with the first match; means for normalizing each of the plurality of raw scores to generate a plurality of percentile weights, wherein each percentile weight is associated with a corresponding raw score; and means for generating the first weight value as a function of the plurality of percentile weights.

Example 44 includes the subject matter of any of Examples 34-43, and wherein the means for generating the plurality of raw scores comprises means for generating a length weight, a frequency count weight, and an extra bit weight.

Example 45 includes the subject matter of any of Examples 34-44, and wherein the means for generating the first weight value further comprises: means for determining whether the first match is adjacent to another match of the plurality of matches; and means for generating the first weight value as a function of an adjacency bonus in response to determining that the first match is adjacent to another match, wherein the adjacency bonus comprises a plurality of percentile weights associated with the other match.

Example 46 includes the subject matter of any of Examples 34-45, and wherein the means for generating the first weight value as a function of the plurality of percentile weights comprises means for adjusting a relative importance of each percentile weight of the plurality of percentile weights.

Example 47 includes the subject matter of any of Examples 34-46, and wherein the means for adjusting the relative importance of each percentile weight of the plurality of percentile weights comprises: means for multiplying each percentile weight of the plurality of percentile weights by a corresponding constant to generate a corresponding product; and means for summing the plurality of products to generate the first weight value.

Example 48 includes the subject matter of any of Examples 34-47, and wherein the means for adjusting the relative importance of each percentile weight comprises means for adjusting the relative importance of each percentile weight based on a data type of the input data stream.

The invention claimed is:

1. A computing device for data compression token generation, the computing device comprising:
   a hardware processor; and
   one or more memory devices having stored therein a plurality of instructions that, when executed by the hardware processor, cause the computing device to establish:
   a plurality of search agents to search for a plurality of matches and to generate a plurality of weight values, wherein each search agent is associated with a different index, and wherein each search agent is to:
      search, in parallel, a history of an input stream for a corresponding match of the plurality of matches, wherein the corresponding match comprises a substring of the history that matches the input stream starting at a position that is based on the index associated with the search agent, and wherein the corresponding match is associated with a length and a distance; and
      generate, in parallel, a corresponding weight value of the plurality of weight values, wherein each weight value is associated with a corresponding match of the plurality of matches, and wherein each weight value is indicative of the length associated with the corresponding match and an encoded length associated with the corresponding match, wherein the encoded length is indicative of a number of bits to encode the corresponding match, wherein to generate the corresponding weight value comprises to:
         generate a raw score associated with the corresponding match based on the length associated with the corresponding match or the encoded length associated with the corresponding match, wherein to generate the raw score comprises to generate a frequency count weight as a function of a first frequency count of the length associated with the corresponding match and a second frequency count of the distance associated with the corresponding match;
         normalize the raw score to generate a percentile weight based on a maximum of a plurality of raw scores, wherein each raw score of the plurality of raw scores is associated with a match of the plurality of matches; and
         generate the corresponding weight value as a function of the percentile weight; and
   a decision engine to select a selected match from the plurality of matches as a function of the plurality of weight values.

2. The computing device of claim 1, wherein to generate the corresponding weight value comprises to
   determine whether the distance associated with the corresponding match is included in a move-to-front stack;
   replace the distance associated with the corresponding match with a symbol from the move-to-front stack in response to a determination that the distance associated with the corresponding match is included in the move-to-front stack; and
   move the distance associated with the corresponding match to a front of the move-to front stack in response to a determination of whether the distance associated with the corresponding match is included in the move-to-front stack.

3. The computing device of claim 1, wherein to generate the raw score comprises to generate a length weight as a function of the length associated with the corresponding match and the index associated with the search agent.

4. The computing device of claim 1, wherein to generate the raw score comprises to generate an extra bit weight as a function of a number of extra bits corresponding to the distance associated with the corresponding match and a predetermined maximum number of extra bits.

5. The computing device of claim 1, wherein to generate the corresponding weight value comprises to:
   generate a plurality of raw scores associated with the corresponding match based on the length associated with the corresponding match and the encoded length associated with the corresponding match;
   normalize each of the plurality of raw scores to generate a plurality of percentile weights, wherein each percentile weight is associated with a corresponding raw score; and
   generate the corresponding weight value as a function of the plurality of percentile weights.

6. The computing device of claim 5, wherein to generate the corresponding weight value further comprises to:
   determine whether the corresponding match is adjacent to another match of the plurality of matches; and
   generate the corresponding weight value as a function of an adjacency bonus in response to a determination that the corresponding match is adjacent to another match, wherein the adjacency bonus comprises a plurality of percentile weights associated with the other match.

7. The computing device of claim 5, wherein to generate the corresponding weight value as a function of the plurality of percentile weights comprises to adjust a relative importance of each percentile weight of the plurality of percentile weights.

8. The computing device of claim 7, wherein to adjust the relative importance of each percentile weight of the plurality of percentile weights comprises to:
   multiply each percentile weight of the plurality of percentile weights by a corresponding constant to generate a corresponding product; and
   sum the plurality of products to generate the corresponding weight value.

9. The computing device of claim 7, wherein to adjust the relative importance of each percentile weight comprises to adjust the relative importance of each percentile weight based on a data type of the input data stream.

10. A method for data compression token generation, the method comprising:

searching in parallel, by a computing device, a history of an input stream for a plurality of matches, wherein each match comprises a substring of the history that matches the input stream starting at a position based on a corresponding index, and wherein each match is associated with a length and a distance;

generating in parallel, by the computing device, a plurality of weight values, wherein each weight value is associated with a corresponding match of the plurality of matches, and wherein each weight value is indicative of the length associated with the corresponding match and an encoded length associated with the corresponding match, wherein the encoded length is indicative of a number of bits to encode the corresponding match, wherein generating in parallel the plurality of weight values comprises generating a first weight value associated with a first match of the plurality of matches, and wherein generating the first weight value comprises:

generating a raw score associated with the first match based on the length associated with the first match or the encoded length associated with the first match, wherein generating the raw score comprises generating a frequency count weight as a function of a first frequency count of the first length and a second frequency count of the first distance;

normalizing the raw score to generate a percentile weight based on a maximum of a plurality of raw scores, wherein each raw score of the plurality of raw scores is associated with a corresponding match of the plurality of matches; and generating the first weight value as a function of the percentile weight; and selecting, by the computing device, a selected match from the plurality of matches as a function of the plurality of weight values.

11. The method of claim 10, wherein generating in parallel the plurality of weight values comprises generating a first weight value associated with a first match of the plurality of matches, and wherein generating the first weight value comprises:

determining whether a first distance of the first match is included in a move-to-front stack;

replacing the first distance with a corresponding symbol from the move-to-front stack in response to determining that the first distance of the first match is included in the move-to-front stack; and moving the first distance to a front of the move-to front stack in response to determining whether the first distance of the first match is included in the move-to-front stack.

12. The method of claim 10, wherein generating the raw score comprises generating an extra bit weight as a function of a number of extra bits corresponding to the first distance and a predetermined maximum number of extra bits.

13. The method of claim 10, wherein generating in parallel the plurality of weight values comprises generating a first weight value associated with a first match of the plurality of matches, and wherein generating the first weight value comprises:

generating a plurality of raw scores associated with the first match based on the length associated with the first match and the encoded length associated with the first match;

normalizing each of the plurality of raw scores to generate a plurality of percentile weights, wherein each percentile weight is associated with a corresponding raw score; and generating the first weight value as a function of the plurality of percentile weights.

14. The method of claim 13, wherein generating the first weight value further comprises:

determining whether the first match is adjacent to another match of the plurality of matches; and generating the first weight value as a function of an adjacency bonus in response to determining that the first match is adjacent to another match, wherein the adjacency bonus comprises a plurality of percentile weights associated with the other match.

15. One or more computer-readable storage media comprising a plurality of instructions that in response to being executed cause a computing device to:

search in parallel a history of an input stream for a plurality of matches, wherein each match comprises a substring of the history that matches the input stream starting at a position based on a corresponding index, and wherein each match is associated with a length and a distance;

generate in parallel a plurality of weight values, wherein each weight value is associated with a corresponding match of the plurality of matches, and wherein each weight value is indicative of the length associated with the corresponding match and an encoded length associated with the corresponding match, wherein the encoded length is indicative of a number of bits to encode the corresponding match; wherein to generate in parallel the plurality of weight values comprises to generate a first weight value associated with a first match of the plurality of matches, and wherein to generate the first weight value comprises to:

generate a raw score associated with the first match based on the length associated with the first match or the encoded length associated with the first match, wherein to generate the raw score comprises to generate a frequency count weight as a function of a first frequency count of the first length and a second frequency count of the first distance;

normalize the raw score to generate a percentile weight based on a maximum of a plurality of raw scores, wherein each raw score of the plurality of raw scores is associated with a corresponding match of the plurality of matches; and generate the first weight value as a function of the percentile weight; and select a selected match from the plurality of matches as a function of the plurality of weight values.

16. The one or more computer-readable storage media of claim 15, wherein to generate in parallel the plurality of weight values comprises to generate a first weight value associated with a first match of the plurality of matches, and wherein to generate the first weight value comprises to:

determine whether a first distance of the first match is included in a move-to-front stack;

replace the first distance with a corresponding symbol from the move-to-front stack in response to determining that the first distance of the first match is included in the move-to-front stack; and move the first distance to a front of the move-to front stack in response to determining whether the first distance of the first match is included in the move-to-front stack.

17. The one or more computer-readable storage media of claim 15, wherein to generate the raw score comprises to generate an extra bit weight as a function of a number of extra bits corresponding to the first distance and a predetermined maximum number of extra bits.

18. The one or more computer-readable storage media of claim 15, wherein to generate in parallel the plurality of weight values comprises to generate a first weight value associated with a first match of the plurality of matches, and wherein generating the first weight value comprises to:
   generate a plurality of raw scores associated with the first match based on the length associated with the first match and the encoded length associated with the first match;
   normalize each of the plurality of raw scores to generate a plurality of percentile weights, wherein each percentile weight is associated with a corresponding raw score; and
   generate the first weight value as a function of the plurality of percentile weights.

19. The one or more computer-readable storage media of claim 18, wherein to generate the first weight value further comprises to:
   determine whether the first match is adjacent to another match of the plurality of matches; and
   generate the first weight value as a function of an adjacency bonus in response to determining that the first match is adjacent to another match, wherein the adjacency bonus comprises a plurality of percentile weights associated with the other match.

* * * * *